United States Patent
Lepley et al.

(10) Patent No.: US 6,474,859 B2
(45) Date of Patent: Nov. 5, 2002

(54) ILLUMINATED LOOPED LIGHT PIPE

(76) Inventors: Geoffrey Peter Lepley, 10 Hemen Road, Canvey Island, Essex 558 8BT (GB); Joep Bijlholt, 360 Hamilton Dr., Holland, MI (US) 49424

( * ) Notice: Subject to any disclaimer, the term of this patent is extended or adjusted under 35 U.S.C. 154(b) by 0 days.

(21) Appl. No.: 09/966,159

(22) Filed: Sep. 28, 2001

(65) Prior Publication Data

US 2002/0018350 A1 Feb. 14, 2002

Related U.S. Application Data

(63) Continuation of application No. 09/402,427, filed as application No. PCT/GB98/00960 on Apr. 22, 1998, now abandoned.

(30) Foreign Application Priority Data

Apr. 22, 1997 (GB) .............................................. 9708147

(51) Int. Cl.⁷ ................................................ F21V 7/04
(52) U.S. Cl. ........................... 362/551; 362/23; 362/26; 362/31

(58) Field of Search ............................... 362/26, 27, 31, 362/551, 556, 582, 23, 30; 385/901, 32, 146

(56) References Cited

U.S. PATENT DOCUMENTS 4,676,584 A * 6/1987 Perlin ........................... 385/32

* cited by examiner

Primary Examiner—Sandra O'Shea
Assistant Examiner—John Anthony Ward
(74) Attorney, Agent, or Firm—Brinks Hofer Gilson & Lione

(57) ABSTRACT

A light pipe illuminator 1 comprises a looped light pipe 3 defining an endless light path, the looped light path 3 including a substantially planar front surface 5 and a faceted back surface 7 comprising a series of angled facets 9 arranged about the loop and arranged to reflect light towards and through the planar front surface 5, and a light input port 11, 13 through which light is fed into the light pipe 3 substantially along the light path, the walls 15, 17 of the light pipe 3 arranged such that light entering the light pipe 3 travels about the loop such that the loop is illuminated through the front surface 5.

16 Claims, 2 Drawing Sheets

ILLUMINATED LOOPED LIGHT PIPE

REFERENCE TO PREVIOUS APPLICATION

This application is a continuation of U.S. application Ser. No. 09/402,427 filed on Oct. 7, 1999 now abandoned, which is a 371 of PCT/GB98/0096 filed Apr. 22, 1998.

FIELD OF THE INVENTION

The invention relates to a light pipe illuminator. The invention is of particular advantage for use in illumination of dials and knobs.

Faceted light pipes are well known for the illumination and back lighting of liquid crystal displays where a planar surface is back lit by a wedge shaped light pipe having a planar front surface and a faceted back surface. Light is fed into the light pipe and the light travels along the light pipe until it hits a facet whereupon it is reflected towards and through the front surface. The light pipe includes a series of angled facets along its length thus illuminating the whole surface overlying the light pipe.

SUMMARY OF THE INVENTION

According to the invention there is provided a light pipe illuminator comprising a looped light pipe defining an endless light path, the looped light path including a substantially planar front surface and a faceted back surface comprising a series of angled facets arranged about the loop and arranged to reflect light towards and through the planar front surface, and at least one light input port along the light path, the walls of the looped light path arranged such that the light entering the light pipe travels about the loop such that the loop is illuminated through out the front surface.

Thus the loop may surround an object which needs to be illuminated rather than having to illuminate a whole surface part of which may lie behind a solid object through which light may not pass.

Once light has entered the light pipe the light travels about the light path by total internal reflection so that the energy required to light such a loop is kept low.

Preferably in order for there to be minimal light losses the loop is annular or partially annular so that it may be used to illuminate round objects such as dials, knobs, etc. This is particularly useful for lighting dials and knobs on an instrument panel of for example a motor vehicle.

In order to effect even light distribution preferably the illuminator includes two light input ports arranged to diametrically opposite regions of the looped light pipe.

The light pipe is typically of a clear acrylic or polycarbonate material.

Preferably the light source comprises light emitting diodes.

It is nor essential that the light rays input into the ports are collimated there may be cases for example when the light path is long for example with a large diameter loop when collimated light will help to ensure that the entire loop is illuminated.

Typically the light path tapers from a maximum cross-section at the light source to a minimum at the next light source.

In such a case preferably the input port includes a light input device in accordance with the applicant's co-pending application entitled "Light Input Device for Light Pipe Illuminator". Such a light input device comprises a first convex lens arranged such that its principal focus lies substantially at the light source such that rays of light from the light source after passing through the lens are substantially parallel to the principal axis of the first lens, and an auxiliary light collecting device, extending from the periphery of the first lens, and comprising a plurality of secondary convex lenses, the principal focus of each secondary lens substantially coinciding with the light source and the principal axis of the first lens, each secondary lens producing collimated light at an angle to the principal axis of the first lens, and for each secondary lens, a reflective surface arranged such that collimated light having passed through the secondary lens is reflected to a direction substantially parallel to the principal axis of the first lens.

Typically the depth of the light path is between 1 cm and 5 cm, and the diameter of the curved loop is up to 20 cm.

DETAILED DESCRIPTION OF THE PREFERRED EMBODIMENT

Figure 1:
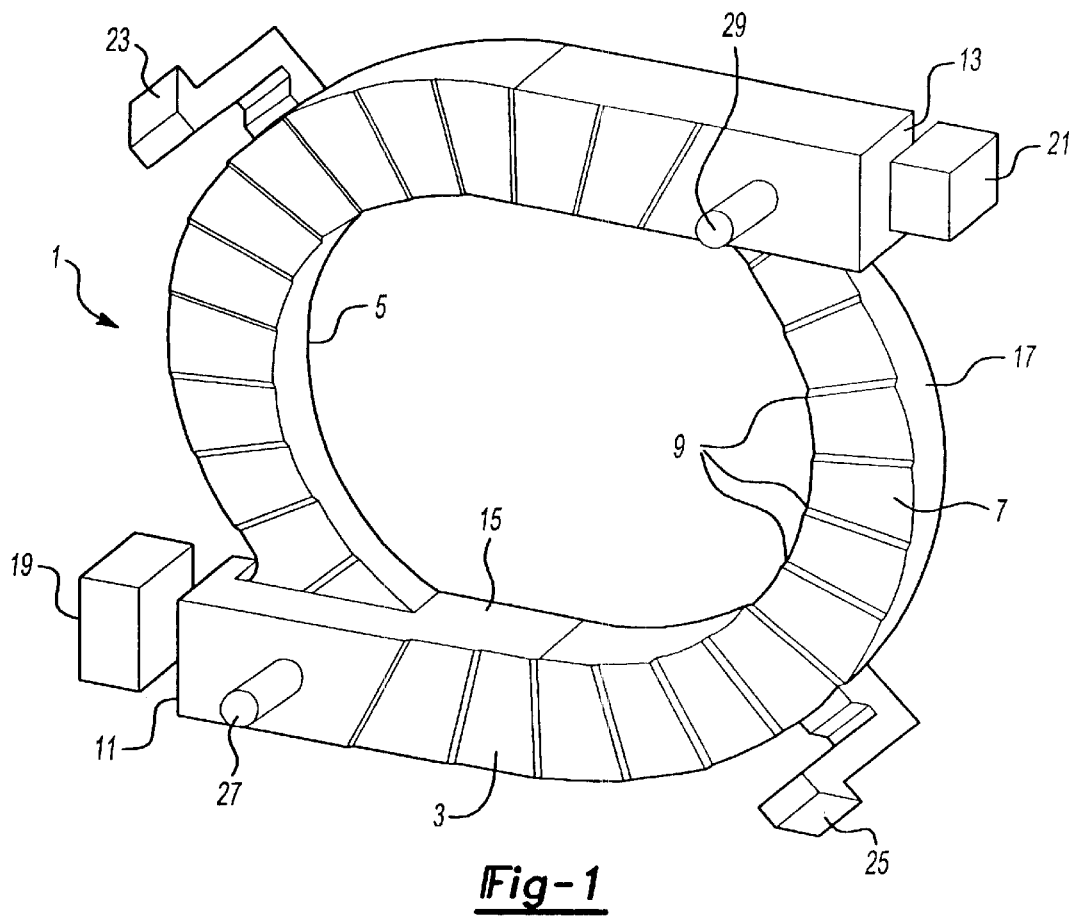
FIG. 1 is a perspective view from behind the light pipe illuminator.

A light pipe illuminator 1 comprises a looped light pipe 3 defining an endless light path, the looped light pipe 3 including a substantially planar front surface 5 and a faceted back surface 7 comprising a series of angled facets 9 arranged about the loop and arranged to reflect light towards and through the planar front surface 5, and a light input port 11, 13 through which light is fed into the light pipe 3 preferably substantially along the light path, the walls 15, 17 of the light pipe 3 arranged such that light entering the light pipe 3 travels about the loop such that the loop is illuminated through the front surface 5. As used herein, the term 'endless light path' refers to the looped structure of the light path, which is best illustrated in FIG. 1. This structure has no beginning or end, and is therefore endless.

In this case the illuminator 1 includes two light input ports 11, 13 inputting light from light emitting diodes 19, 21. The light pipe 3 is of moulded polycarbonate and includes mounting brackets 23, 25 used for mounting the illuminator 1 about the item to be illuminated. As shown in FIG. 1, the light pipe 3 may also include additional structural features, such as pins 27, 29 that facilitate such mounting. In this case the light path defined is part annular so that the loop may be placed over and around a dial. Here the light path is used to illuminate the round knobs upon a car radio.

Figure 2:
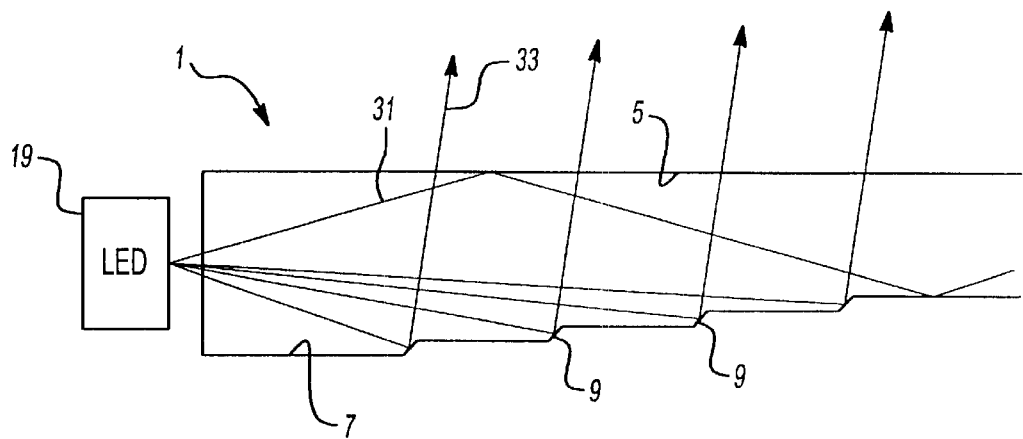
FIG. 2 is a section through part of FIG. 1.

As best illustrated in FIG. 2, some of the light rays 31 from LED's 19, 21 are fed into the light pipe 3 through the two diametrically opposed light input ports 11, 13 and then passed along the light path by total internal reflection. However other rays 33 hit facets 9 and are reflected towards and through planar front surface 5 to illuminate the annulus.

The facets 9 are arranged in steps which preferably decrease the depth of the light pipe 3 in a direction away from the light sources 19, 21. In the preferred embodiment, the depth of the light pipe 3 decreases from 4 cm to 1.8 cm along half the light path in an anti-clockwise direction as seen in FIG. 1. The curved region of the loop has a diameter of 14.8 cm.

Figure 3:
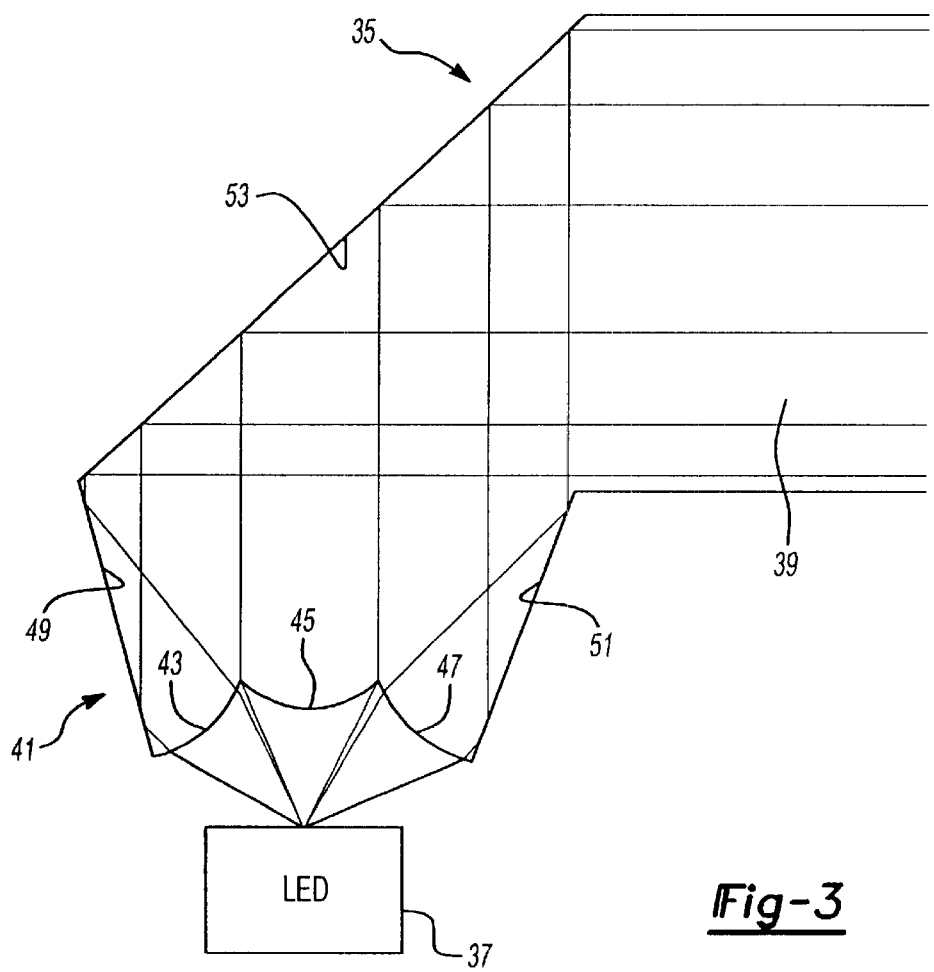
FIG. 3 is a section through part of FIG. 1 and illustrates a second embodiment of the invention.

FIG. 3, illustrates an alternate embodiment of the invention. In this example, the illuminator 35 includes a light source 37 angulated with respect to the light pipe 39.

Preferably, the light input port 41 is arranged orthogonally with respect to the light pipe 39 and light path. Also preferably, the light input port 41 includes a series of lenses 43, 45, 47 that reflects light rays in a direction substantially along the light path light rays to reflective surfaces 49, 51. A further reflective surface 53 positioned opposite the light source 37 reflects light rays in a direction substantially along the light path.

We claim:

1. A light pipe illuminator comprising a looped light pipe defining a light path, the looped light pipe including a substantially planar front surface and a faceted back surface having a series of angled facets arranged about the light pipe and arranged to reflect light towards and through the planar front surface, and at least one light input port through which light is fed into the light pipe.

2. A light pipe illuminator according to claim 1, in which the light path is substantially annular.

3. A light pipe illuminator according to claim 1, in which the light pipe is of clear acrylic or polycarbonate material.

4. A light pipe illuminator according to claim 1, further comprising at least one light emitting diode.

5. A light pipe illuminator according to claim 1, further comprising at least one mounting bracket for mounting the illuminator about an item to be illuminated.

6. A light pipe illuminator according to claim 1, further comprising a second light input port.

7. A light pipe illuminator according to claim 6, wherein the first and second light input ports are diametrically opposed.

8. A light pipe illuminator according to claim 1 wherein the series of angled facets is arranged such that the depth of the light pipe illuminator decreases in a direction away from the light input port.

9. A light pipe illuminator according to claim 1, wherein the light input port is arranged such that light is fed into the light pipe substantially along the light path.

10. A light pipe illuminator according to claim 1, wherein the light input port is arranged such that light is fed into the light pipe at an angle with respect to the light path.

11. A light pipe illuminator according to claim 10, wherein the light input port is arranged orthogonally with respect to the light path.

12. A light pipe illuminator according to claim 10, further comprising a reflective surface arranged to reflect light substantially along the light path.

13. A light pipe illuminator, comprising:

a looped light pipe defining a light path, the looped light pipe including a front surface and a back surface defining a series of angled facets arranged about the looped light path and arranged to reflect light towards and through the front surface, a first light input port through which light is fed into the looped light pipe;

a second light input port; and at least one mounting bracket for mounting the illuminator about an item to be illuminated.

14. A light pipe illuminator according to claim 13 wherein the series of angled facets is arranged such that the depth of the light pipe illuminator decreases in a direction away from the first and second light input ports.

15. A light pipe illuminator according to claim 13, wherein the first and second light input ports are diametrically opposed.

16. A light pipe illuminator according to claim 13, wherein at least the first light input port is arranged such that light is fed into the light pipe at an angle with respect to the light path.

* * * * *